(12) United States Patent
Abel et al.

(10) Patent No.: US 7,812,749 B2
(45) Date of Patent: Oct. 12, 2010

(54) DC OFFSET DETECTION AND CORRECTION FOR USER TRAFFIC

(75) Inventors: Christopher Abel, Coplay, PA (US);
Mohammad Mobin, Orefield, PA (US);
Robert Kapuschinsky, Hazelton, PA (US); Lane Smith, Easton, PA (US);
Paul Tracy, Schnecksville, PA (US);
Gregory Sheets, Bedford, MA (US)

(73) Assignee: LSI Corporation, Milpitas, CA (US)

( * ) Notice: Subject to any disclaimer, the term of this patent is extended or adjusted under 35 U.S.C. 154(b) by 40 days.

(21) Appl. No.: 12/380,639

(22) Filed: Mar. 2, 2009

(65) Prior Publication Data

US 2010/0219996 A1  Sep. 2, 2010

(51) Int. Cl.
*H03M 1/06* (2006.01)
(52) U.S. Cl. ..................................... 341/118; 341/155
(58) Field of Classification Search ................ 341/118, 341/120, 155, 168; 702/79; 324/763
See application file for complete search history.

(56) References Cited

U.S. PATENT DOCUMENTS

| 6,104,326 | A * | 8/2000 | Lee et al. ........................ 341/68 |
| 7,281,176 | B2 * | 10/2007 | Eldredge ...................... 714/709 |
| 2007/0183552 | A1 * | 8/2007 | Sanders et al. ............... 375/376 |
| 2007/0271052 | A1 * | 11/2007 | Abel et al. ...................... 702/79 |
| 2010/0097087 | A1 * | 4/2010 | Hogeboom et al. .......... 324/763 |

* cited by examiner

*Primary Examiner*—Peguy JeanPierre

(57) ABSTRACT

In described embodiments, a communication system employing, for example, clock and data recovery (CDR) detects and applies correction for DC offset in an input data stream signal, termed as "DC offset calibration". DC offset calibration applies static calibration for DC offset in input circuits, such as an input amplifier and detection latches, without input data, and applies statistical calibration for DC offset during operation with an input data stream to correct for dynamic shifts in DC level. Such DC offset calibration employs data eye measurements of the input data stream for detection of DC offset, and applies an opposite DC offset to maintain a relatively balanced data eye during live traffic.

20 Claims, 5 Drawing Sheets

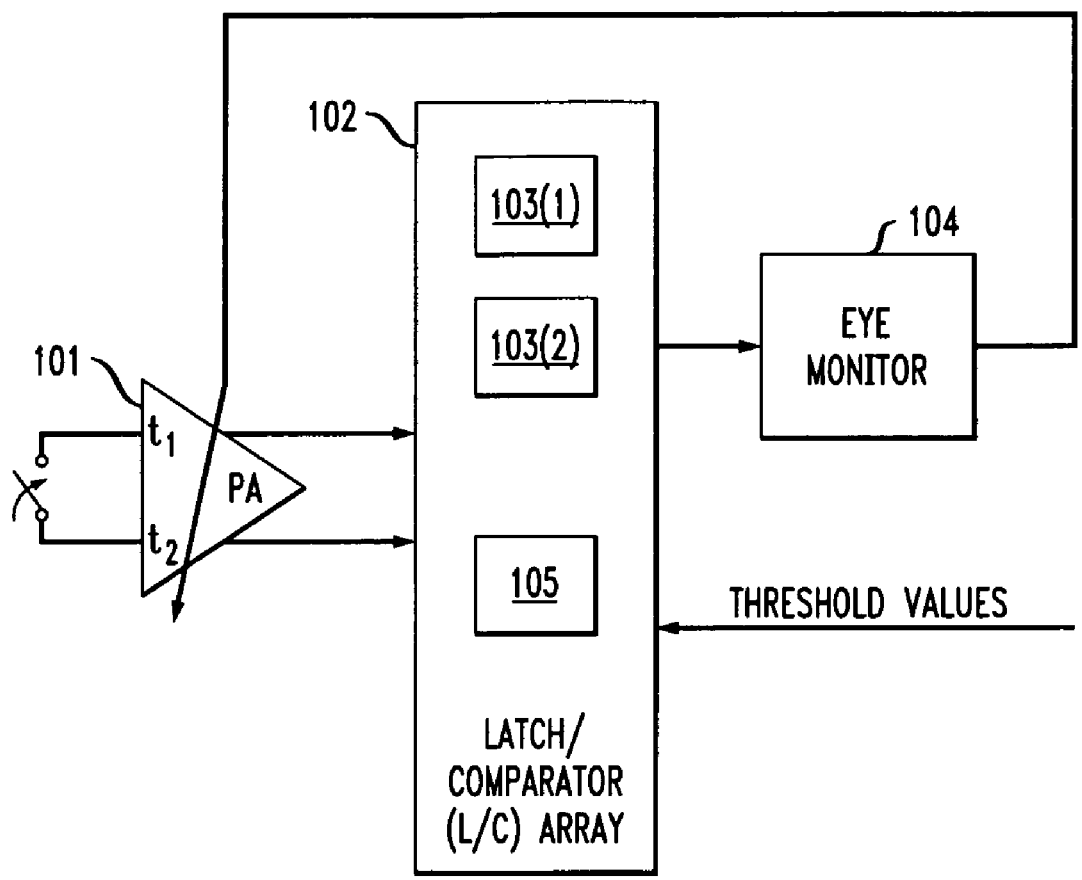

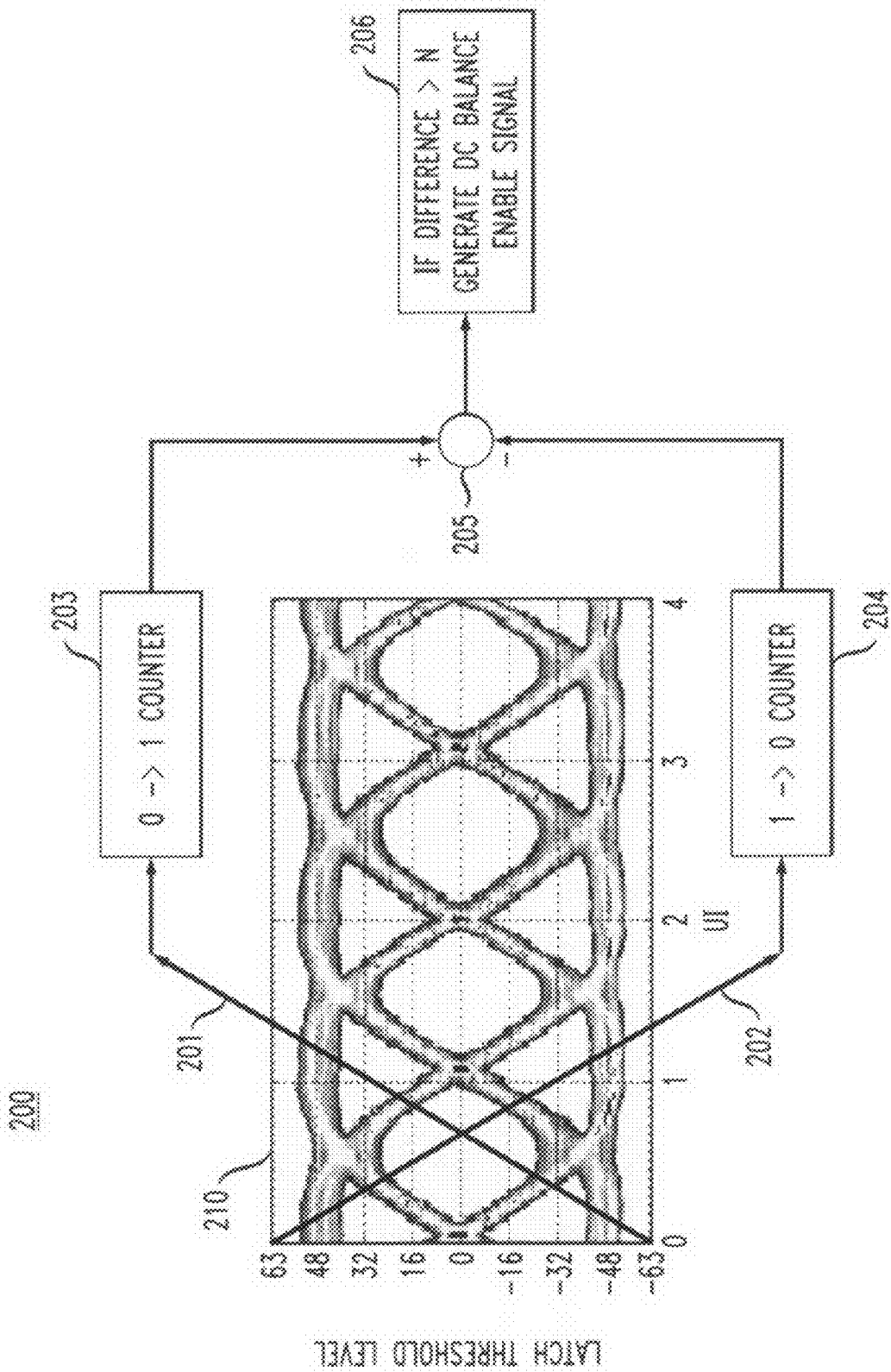

DC OFFSET DETECTION AND CORRECTION FOR USER TRAFFIC

BACKGROUND OF THE INVENTION

1. Field of the Invention

The present invention relates to clock and data recovery (CDR) systems, and, in particular, to correction of DC offset in a CDR system.

2. Background of the Invention

In many applications, including digital communications, clock and data recovery (CDR) systems are employed to recover correct timing (frequency and phase) of an input data stream, which timing is then employed to sample the input data stream to recover the user data for decoding. A serializer and de-serializer (SerDes) device is commonly used in high speed communications to convert data between serial and parallel interfaces in each transmit/receive direction.

SerDes devices often employ an encoding scheme that supports DC-balance, provides framing, and guarantees signal transitions. Guaranteed transitions allow a receiver to extract the embedded clock signal (clock data recovery, or CDR), while control codes allow framing, typically on the start of a data packet. This encoding scheme also improves error detection with running disparity, providing separation of data bits from control bits, and permits derivation of byte and word synchronization.

Mismatches in the analog symmetric path give rise to DC offset in the input signal, degrading system performance of a CDR system. Usually, calibration for DC offset is performed prior to operation with live traffic (a user data stream). DC offset calibration is performed by shorting the device input and applying an opposite DC offset to equalize the built-in offset. However, DC offset is a function of gain, and during operation with a user data stream, the DC offset varies as a function of gain.

SUMMARY OF THE INVENTION

In one embodiment, the present invention allows for circuit calibration in, for example, a Serializer/DeSerializer receiver by a) monitoring a data eye of the circuit with an eye detector for transitions; b) setting trim of an amplifier, trim of at least one latch and trim of at least one comparator for static calibration of DC offset of the circuit in an absence of an input data stream when at least one transition occurs and c) setting the trim of the amplifier for statistical calibration of DC offset during operation in a presence of the input data stream based on a symmetry of the data eye.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows a block diagram of a DC Offset calibration system in accordance with an exemplary embodiment of the present invention;

FIG. 2 shows a DC balance detector as might be employed by the DC offset calibration system of FIG. 1;

DETAILED DESCRIPTION

Figure 3A:
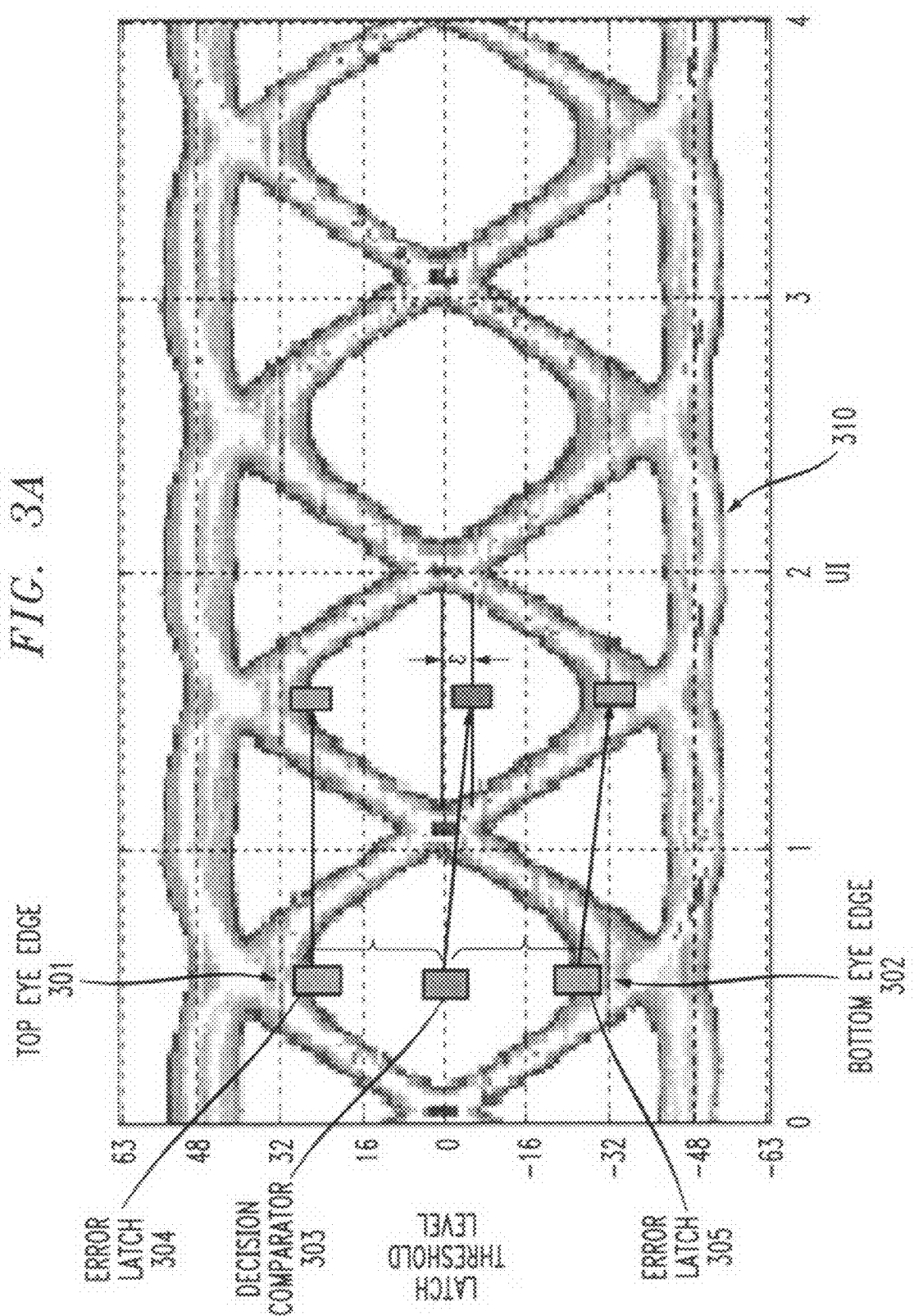
FIG. 3A shows a data eye diagram without DC offset and latch placement as might be employed by the DC offset calibration system of FIG. 1.

In accordance with exemplary embodiments of the present invention, a communication system employing, for example, clock and data recovery (CDR), detects and applies correction for DC offset in an input data stream signal, termed herein as "DC offset calibration". DC offset calibration in accordance with exemplary embodiments of the present invention applies i) static calibration for DC offset without an input data stream and ii) statistical calibration for DC offset during operation with an input (e.g., user or random) data stream. Such DC offset calibration employs data eye measurements of the input data stream for detection of DC offset, and applies opposite DC offset to maintain a relatively balanced data eye during the presence of, for example, live traffic (input user data stream).

FIG. 1 shows a block diagram of an exemplary DC offset calibration system 100 operating in accordance with an exemplary embodiment of the present invention. As shown in FIG. 1, DC offset calibration system includes pre-amplifier (PA) 101, latch/comparator (L/C) array 102 having latches 103(1), 103(2), and 105, and eye monitor 104. PA 101 amplifies the input signal applied to input terminals t1, t2 of PA 101, and each latch of L/C array 102 compares its input to a corresponding threshold value. Latches 103(1), 103(2) and 105 of L/C array 102 might be employed in a manner known in the art of CDR systems to detect transitions in the data stream corresponding to a transition from logic "1" to logic "0" and from logic "0" to logic "1". While L/C array 102 is shown with two latches 103(1), 103(2), other systems might employ additional latches to detect such transitions.

A data eye diagram might be employed to understand operation by the eye monitor of FIG. 1. Integrity of high-speed data detection might be studied in terms of an eye diagram, such as the eye diagram shown in FIGS. 2 and 3 described subsequently, where traces of received signal waveforms are overlaid on top of each other in one or more unit intervals (UIs). An eye diagram has a vertical dimension (y-axis) in, for example, millivolts (mV) corresponding to a latch threshold, and a horizontal dimension (x-axis) in, for example, picoseconds (ps) corresponding to the UI for a data sample. The form of the eye is dependent on processes employed by a CDR system to detect and recover the data. Such processes might include adaptive equalization applied to the input signal at the front end of the CDR system, and more complex systems might also employ decision feedback equalization (DFE) that employs decisions for previously detected data in the equalized signal to further improve equalization applied to the input signal.

Initially, the data eye of the eye diagram might be symmetric when the circuit is enabled with no or initial input data, but typically, some tuning is required to correct for DC offset in the eye. Such DC offset initially might be caused by mismatched circuit operating parameter in the front end amplifier stages of a receiver (e.g., at PA 101), and might be compensated for in a given implementation at start-up or by trimming amplifiers during production of a device. As dynamic DC offset build-up occurs, the data eye might become asymmetric. Such dynamic DC offset build-up might occur, for example, through changes in transistor and other circuit element performance due to temperature variations, frequency characteristic variations, and/or leaky current variations of, for example, an integrated circuit implementation for a device such as an amplifier. Compensation for dynamic DC offset build-up represents a challenge to a designer since the build-up varies dependent upon device, operation and environment.

FIG. 2 shows a DC balance detector 200 as might be employed by eye monitor 104 of DC offset calibration system 100 of FIG. 1. DC balance detector 200 monitors data transitions in an eye, shown as eye diagram 210 in the FIG. 2, where a transition from a first to second logic value (e.g., logic "0" to logic "1") is shown as arrow 201 and a transition from a third to a fourth logic value (e.g., logic "1" to logic "0") is shown as arrow 202. Transitions from a first to second logic value are counted using counter 203, and transitions from a third to a fourth logic value are counted using counter 204. Assuming random input data or an input training sequence with uniformly distributed transitions, the counter values of counters 203 and 204 should remain substantially equivalent. The difference in counter values of counters 203 and 204 is generated in combiner 205. Based on the difference from combiner 205, processor 206 generates a DC Balance Enable Signal indicating that the difference is greater than a threshold count value N. If the difference is greater than a threshold count value N, a process of DC balancing should start. The DC Balance Enable Signal is used to indicate that the data eye is asymmetric (exhibits DC unbalance), allowing for subsequent calculation of the DC offset of the data eye from the zero-crossing threshold.

Depending on the data detection algorithm employed and whether or not equalization employs feedback, one or more eyes might be located for data detection at a given unit interval. As described with respect to FIG. 2, the data detection algorithm locates a single eye. Data latches employed to make a decision for the data should operate near the top and the bottom of the eye. For all algorithms, a preferred condition is that the eye opening for equalized input signal should be large. Other techniques might use decision feedback equalization (DFE). For relatively optimal performance by a data detection algorithm employing DFE, data latches employed to make a decision for the data should operate near the center of the eye. Based on previous data decisions, the data detection algorithm locates two eyes: one eye at the top and one eye at the bottom of the eye diagram. For example, a decision at the top of the eye diagram corresponds to a trace from a previous bit value of logic "1" to the current bit value, and a decision at the bottom of the eye diagram corresponds to a trace from a previous bit value of logic "0" to the current bit value.

FIG. 3A shows a data eye diagram and latch placement as might be employed by DC offset calibration system of FIG. 1 once DC unbalance is detected. The data detection algorithm for FIG. 3 does not employ DFE, and so a single eye is present. Data eye diagram 310 illustrates transitions in data for several UIs. The data eye in the period from UI 0 to UI 1 has top eye edge 301 and bottom eye edge 302. With DC balance enabled from FIG. 2, decision comparator 303 is set with threshold of 0 mV (or at the DFE threshold, if DFE equalization is employed) to be at the center of the eye and to detect the data transition. Error latches 304 and 305 are employed to detect top eye edge 301 and bottom eye edge 302, and have corresponding latch thresholds adaptively set to detect the top eye edge 301 and bottom eye edge 302 threshold values. Once top eye edge 301 and bottom eye edge 302 are detected, the difference between the threshold values of top eye edge 301 and bottom eye edge 302 is substantially equivalent to the DC offset value. At this point, the trim of various circuit elements might be adjusted to correct for the DC offset so that the top eye edge 301 and bottom eye edge 302 threshold values are balanced around a central value.

Figure 3B:
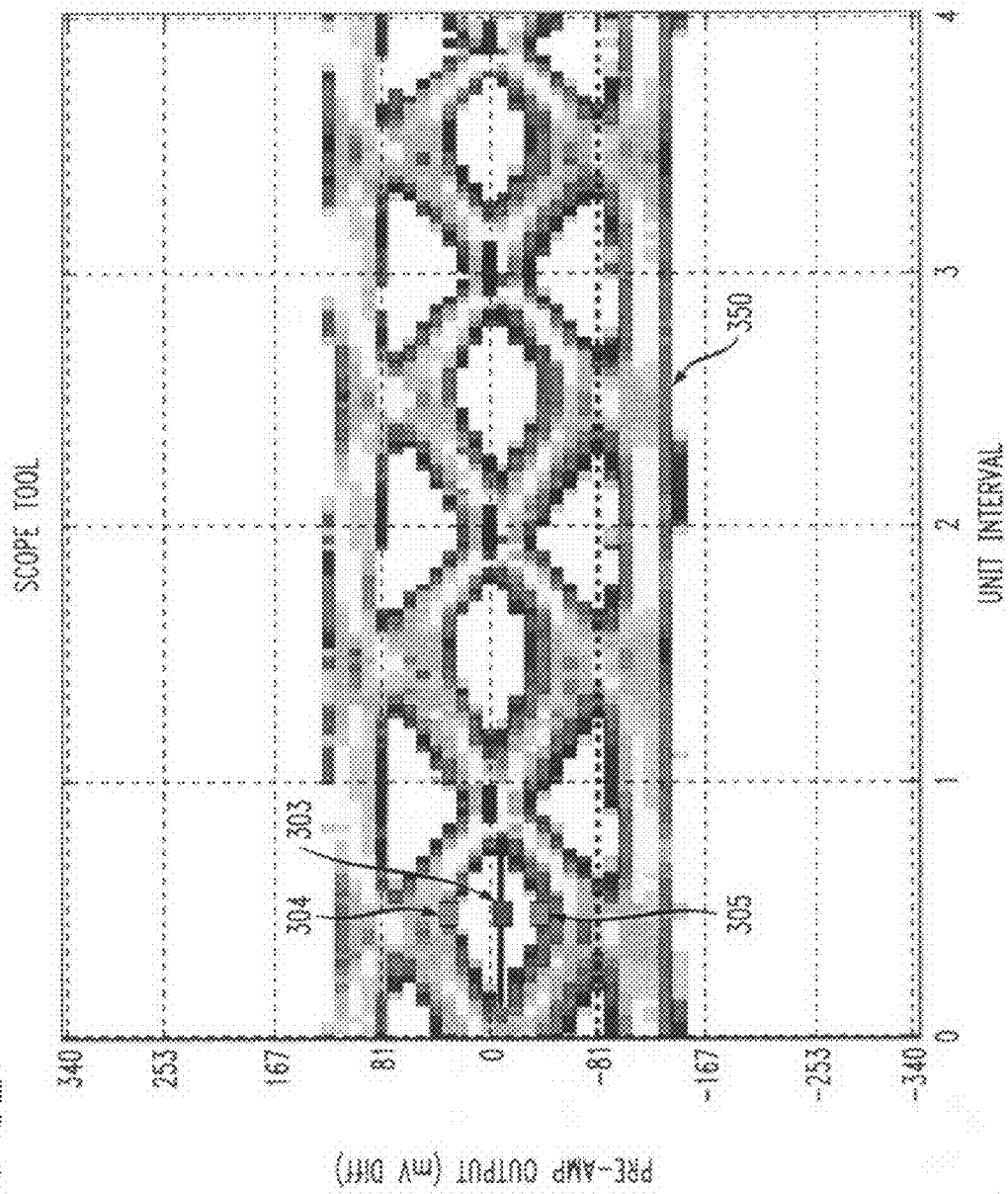
FIG. 3B shows a data eye diagram with DC offset as might be employed by the DC offset calibration system of FIG. 1.

For example, if the top error latch 304 indicates a threshold of 25 mV, and the bottom error latch 305 indicates a threshold of −30 mV, then the DC offset is −5 mV. This example corresponds to the change in levels, illustrated in FIG. 3A from UI 1 to UI 2. From UI 1 to UI 2, a change in DC offset might occur, shown in the FIG. as a change of "8" threshold level mV (corresponding to the −20 mV DC offset of the example). The arrows in the Figure illustrate how the threshold of decision comparator 303 will change to adjust to the center of the eye, and that the corresponding latch threshold of error latches 304 and 305 adaptively detecting top eye edge 301 and bottom eye edge 302 will also change. Note that while the eye center might change by "$\epsilon$", the top eye edge 301 and bottom eye edge 302 threshold values typically change by differing amounts around this value of "$\epsilon$". FIG. 3B shows a data eye diagram having a DC offset as might be employed by the DC offset calibration system of FIG. 1. IN FIG. 3B, decision comparator 303 is set with a threshold of about −10 mV, top error latch 304 is set to detect a threshold of about 40 mV, while bottom error latch 305 is set to detect a threshold of about −50 mV.

In practice, an iterative system is employed during operation. First, the DC unbalance is detected through detection of an asymmetric data eye, and then the trim of the PA is adjusted. If the data eye is still asymmetric, then the trims of the decision comparator and error latches are adjusted to change their detection and latch thresholds, respectively. A test then looks to see if the DC unbalance still exists, in which case the process repeats until the eye is symmetric, indicating DC balance.

Techniques for monitoring a data eye in a CDR system, while the CDR system is operating (i.e., "on-line"), are described in U.S. patent application Ser. No. 11/095,178, filed on Mar. 31, 2005 and having a common assignee with the assignee of this Application. The disclosure of Ser. No. 11/095,178 is incorporated in its entirety herein by reference. Eye monitor 104 of FIG. 1 employs, for example, the techniques described in the disclosure of Ser. No. 11/095,178 to provide measurements of the data eye seen at the input to eye monitor 104.

Figure 4:
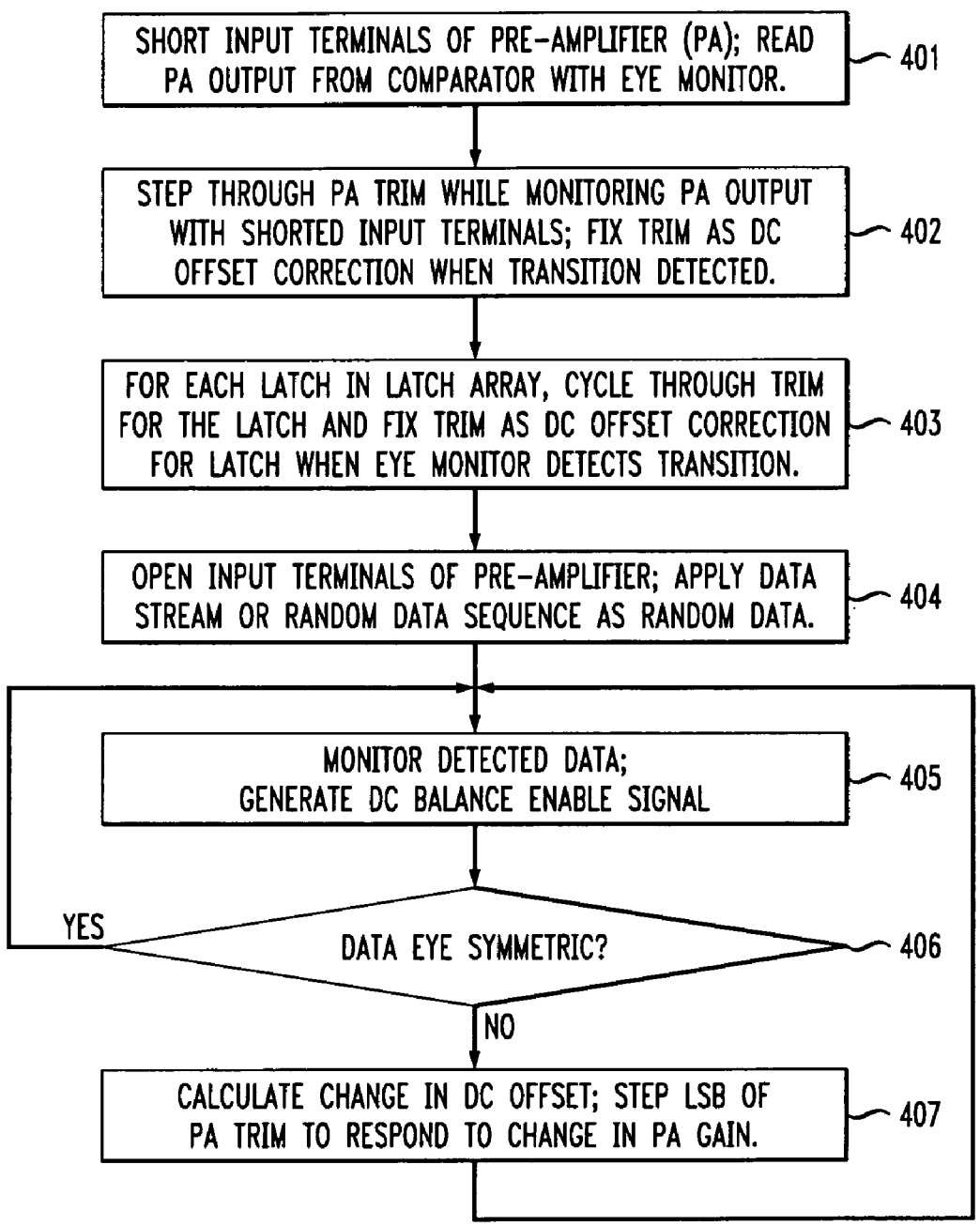
FIG. 4 shows an exemplary method of DC Offset calibration employed by the exemplary embodiment shown in FIG. 1.

Operation of DC offset calibration system 100 is now described with respect to FIG. 4, where FIG. 4 shows an exemplary method of DC Offset calibration employed by the exemplary embodiment shown in FIG. 1. At step 401, input terminals U, t2 of PA 101 are shorted. The output of selected ones of latches (e.g., 103(1), 103(2) and comparator 105 of L/C array 102) is monitored by, for example, eye monitor 104. The output of comparator 105 that is monitored at step 401 represents a detected data transition, and might be implemented as a zero-crossing comparator. At step 402, trim of, for example, PA 101 is stepped to a new value, and such stepping of the trim of PA 101 might be, for example, from the lowest to the highest value. Such stepping of the trim of PA 101 continues until the output of the selected comparator changes, indicating a change or logic transition from a "1" to "0" or from a "0" to a "1". When the output of the comparator changes, the current PA trim value that changes the polarity is set as the operating trim of the PA.

As employed herein, "trim" refers to an input control voltage or bias that modifies DC offset of the output of the device; consequently, modifying the trim of a device moves DC offset in a direction opposite to that of the DC offset generated by the device. Once the transition is detected at step 402, the current trim of PA 101 is maintained as the initial DC offset calibration, without data. The method then advances to step 403.

At step 403, for each latch of the latches, the method cycles through the trim of the given latch and detects the value of the trim of the given latch when, for example, eye monitor 104 detects change or logic transition. The method maintains the value of the trim of the latch as the initial DC offset calibration of the latch when eye monitor 104 detects change or logic transition.

At step 404, input terminals t1, t2 of PA 101 are opened, and random data is applied to PA 101. Random data might be a user data stream, or a predefined repeating random or pseudo-random data sequence. Initially, the data eye of the output of PA 101 through latch array 102 might be symmetric, but as dynamic DC offset build-up occurs, the data eye might become asymmetric or shifted due to DC imbalance. As the DC offset build-up occurs, eye monitor 104 detects the imbalance or asymmetry of the data eye at step 405 for use in statistical calibration for DC offset. Step 405 might generate a DC Balance Enable Signal to detect that DC imbalance has crossed a threshold, such as by the techniques described with respect to FIGS. 2 and 3.

At step 406, a test, such as described previously with respect to FIGS. 2, 3A and 3B, determines whether the data eye is symmetric about the zero-threshold level in response to the DC Balance Enable Signal. If the test of step 406 determines that the data eye is not symmetric, the method advances to step 407 to calculate change in DC offset and to step the LSB of the PA and/or latches. If the test of step 406 determines that the data eye is symmetric, the method returns to step 405 to detect another change in the data eye.

At step 407, the method calculates the imbalance or asymmetry of the data eye by calculating, for example, the difference in top and bottom edge eye heights. Such calculation might occur through techniques described above with respect to FIG. 3, but one skilled in the art might readily extend such techniques to more complicated eye diagrams employing, for example, DFE feedback equalization. At step 407, the LSB (least significant bit) of the trim value applied to PA 101 is stepped up or down, depending on the direction (positive or negative) of change in the difference in top and bottom edge eye heights.

While the exemplary method described with respect to FIG. 3 adjusts the trim of PA 101 to correct for DC offset in the presence of random data, the present invention is not so limited. One skilled in the art might readily adapt step 306, for example, to also adjust the trim of each latch to correct for DC offset.

A system employing one more embodiments of the present invention might allow for the following advantages. Since, DC offset is a function of gain, during operation with a user data stream the system might correct for the DC offset as it varies as a function of gain. Consequently, the system might exhibit improved data detection and timing extraction performance.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

We claim:

1. Apparatus for calibration of a circuit, the apparatus comprising:
    an amplifier having an input and an output;
    a latch/comparator (L/C) array having at least one latch and at least one comparator coupled to the output of the amplifier; and
    an eye monitor, coupled to the amplifier and the L/C array, and adapted to monitor a data eye to detect transitions from each comparator,
    wherein the circuit is configured to i) set trim of the amplifier, trim of each latch, and trim of each comparator for static calibration of DC offset of the circuit in an absence of an input data stream based on detected transitions and ii) set the trim of the amplifier for statistical calibration for DC offset during operation in a presence of the input data stream based on a symmetry of the data eye.

2. The invention of claim 1, wherein, in the absence of the input data stream, the trim of the amplifier, the trim of each latch, and the trim of each comparator is set when the input of the amplifier is in a short circuit state so as to compensate for a DC offset of the circuit in the absence of the input data stream; and, in the presence of an input data stream applied to the input of the amplifier, the circuit is configured to modify the trim of the amplifier based on the data eye so as to compensate for a DC offset of the circuit during operation.

3. The invention of claim 2, wherein the apparatus sets the trim of each latch and the trim of each comparator when the input of the amplifier is in a short circuit state in the absence of the input data stream.

4. The invention of claim 2, wherein the trim of the amplifier and the trim of each latch and the trim of each comparator of the L/C array is set when in the short circuit state when the eye monitor detects a transition between first and second logic states.

5. The invention of claim 2, wherein the trim of the amplifier is set before the trim of each latch and the trim of each comparator of the L/C array when the input of the amplifier is in the short circuit state.

6. The invention of claim 1, wherein, in the presence of the input data stream and when the data eye is not symmetric, the circuit is configured to set the trim of the amplifier for statistical calibration for DC offset.

7. The invention of claim 6, wherein the circuit is configured to set the trim of the amplifier for statistical calibration for DC offset when the data eye is asymmetric by stepping the least significant bit (LSB) of the trim's value until the data eye is symmetric.

8. The invention of claim 1, wherein the circuit is further configured to set the trim of each latch and the trim of each comparator of the L/C array for statistical calibration for DC offset during operation in a presence of the input data stream based on the symmetry of the data eye.

9. The invention of claim 1, wherein the circuit is embodied in an integrated circuit (IC) of a serializer/deserializer (SerDes) receiver.

10. A method of circuit calibration, the method comprising the steps of:
   a) monitoring a data eye of the circuit with an eye detector for transitions;
   b) setting trim of an amplifier, at least one latch, and at least one comparator for static calibration of DC offset of the circuit in an absence of an input data stream when at least one transition occurs; and
   c) setting the trim of the amplifier for statistical calibration for DC offset during operation in a presence of the input data stream based on a symmetry of the data eye.

11. The invention of claim 10, wherein:
step b) comprises the steps of:
   b1) varying a trim of the amplifier, a trim of each latch, and a trim of each comparator,
   b2) detecting a transition in the monitored eye, and
   b3) setting the trim of the amplifier, the trim of each latch, and the trim of each comparator based upon a corresponding detected transition; and
step c) comprises the steps of:
   c1) varying a trim of the amplifier,
   c2) detecting a symmetry of the monitored eye, and
   c3) setting the trim of the amplifier based upon a corresponding detected symmetry of the monitored eye.

12. The invention of claim 11, wherein, in the absence of the input data stream, step b) sets the trim of the amplifier and the trim of each latch when the input of the amplifier is in a short circuit state so as to compensate for a DC offset of the circuit in the absence of the input data stream; and, in the presence of an input data stream applied to the input of the amplifier, step c) modifies the trim of the amplifier based on the data eye so as to compensate for a DC offset of the circuit during operation.

13. The invention of claim 12, wherein step b) sets the trim of each latch and the trim of each comparator when the input of the amplifier is in a short circuit state in the absence of the input data stream.

14. The invention of claim 12, wherein step b) sets the trim of the amplifier, the trim of each latch and the trim of each comparator when in the short circuit state when the eye monitor detects a transition between first and second logic states.

15. The invention of claim 12, wherein step b) sets the trim of the amplifier before setting the trim of each latch and the trim of each comparator when the input of the amplifier is in the short circuit state.

16. The invention of claim 11, wherein, in the presence of the input data stream and when the data eye is asymmetric, step c) sets the trim of the amplifier for statistical calibration for DC offset.

17. The invention of claim 16, wherein step c) sets the trim of the amplifier for statistical calibration for DC offset when the data eye is not symmetric by the step of stepping the least significant bit (LSB) of the trim's value until the data eye is symmetric.

18. The invention of claim 11, wherein step c) further comprises the step of setting the trim of the each latch and the trim of each comparator for statistical calibration for DC offset during operation in a presence of the input data stream based on the symmetry of the data eye.

19. A machine-readable medium, having encoded thereon program code, wherein, when the program code is executed by a machine, the machine implements a method for circuit calibration, comprising the steps of:
   a) monitoring a data eye of the circuit with an eye detector for transitions;
   b) setting trim of an amplifier, at least one latch, and at least one comparator for static calibration of DC offset of the circuit in an absence of an input data stream when at least one transition occurs; and
   c) setting the trim of the amplifier for statistical calibration for DC offset during operation in a presence of the input data stream based on a symmetry of the data eye.

20. The invention of claim 19, wherein:
step b) comprises the steps of:
   b1) varying a trim of the amplifier, a trim of each latch, and a trim of each comparator,
   b2) detecting a transition in the monitored eye, and
   b3) setting the trim of the amplifier, the trim of each latch, and the trim of each comparator based upon a corresponding detected transition; and
step c) comprises the steps of:
   c1) varying a trim of the amplifier,
   c2) detecting a symmetry of the monitored eye, and
   c3) setting the trim of the amplifier based upon a corresponding detected symmetry of the monitored eye.

* * * * *